United States Patent
Croft

Patent Number: 5,816,547
Date of Patent: Oct. 6, 1998

[54] FIXING MEANS

[76] Inventor: Madeleine Monique Croft, 1/21 Currie Street, Jolimont, Australia

[21] Appl. No.: 676,162
[22] PCT Filed: Jan. 17, 1995
[86] PCT No.: PCT/AU95/00023
   § 371 Date: Jul. 15, 1996
   § 102(e) Date: Jul. 15, 1996
[87] PCT Pub. No.: WO95/19506
   PCT Pub. Date: Jul. 20, 1995

[30] Foreign Application Priority Data

Jan. 18, 1994 [AU] Australia .................... PM3401

[51] Int. Cl.$^6$ .................................................... F16B 47/00
[52] U.S. Cl. ......................... 248/205.5; 248/205.7; 248/205.8; 248/206.2; 248/362
[58] Field of Search ................. 248/205.5, 362, 248/205.6, 206.2, 205.7

[56] References Cited

U.S. PATENT DOCUMENTS

| | | | |
|---|---|---|---|
| 957,804 | 5/1910 | Schroeder | 248/205.7 |
| 993,989 | 5/1911 | Hazelrigg | 248/205.7 |
| 1,010,363 | 11/1911 | Hazelrigg | 248/205.7 |
| 1,026,263 | 5/1912 | Hazelrigg | 248/205.7 |
| 1,751,463 | 3/1930 | Backus et al. | 248/205.5 X |
| 2,006,843 | 7/1935 | Russell | 348/205.5 |
| 2,190,550 | 2/1940 | Simmons | 248/205.7 |
| 2,505,899 | 5/1950 | Jobe | 248/205.7 |
| 2,800,078 | 7/1957 | Lightbourn . | |
| 4,197,616 | 4/1980 | Panuski | 248/205.7 X |
| 4,607,875 | 8/1986 | McGill | 248/205.5 X |
| 4,779,829 | 10/1988 | Rocke | 248/206.2 |
| 4,991,806 | 2/1991 | Nakamura et al. | 248/206.2 |
| 5,133,524 | 7/1992 | Liu | 248/205.8 |
| 5,176,346 | 1/1993 | Liu | 248/362 X |
| 5,356,102 | 10/1994 | Blumenaus | 248/205.5 |
| 5,422,520 | 6/1995 | Kilgore | 248/205.5 X |
| 5,613,659 | 3/1997 | Hong | 248/205.5 |
| 5,651,520 | 7/1997 | Belokin et al. | 248/205.5 X |

FOREIGN PATENT DOCUMENTS

| | | | |
|---|---|---|---|
| A10833/66 | 3/1968 | Australia . | |
| 2250397 | 5/1975 | France . | |
| 340813 | 1/1931 | United Kingdom | 248/205.7 |
| 1138865 | 1/1969 | United Kingdom . | |
| 117520 | 11/1969 | United Kingdom . | |

Primary Examiner—Jose V. Chen
Assistant Examiner—Rodney B. White
Attorney, Agent, or Firm—Ladas & Parry

[57] ABSTRACT

A fixing means comprising a support (11) adapted to be engageable with a surface (21) and which is capable of removal from the surface (21). A support portion (12) is provided on the support (11) and a resilient retention means (14) is fixed to the support portion (12) to extend to at least one side of the support (11). The retention means (14) has a bearing portion (19,20) adapted to bear on the surface (21). The retention means (14) is shaped whereby when the support (11) is applied onto the surface (21), the bearing portion (19,20) is resiliently biased into engagement with the surface (21).

18 Claims, 5 Drawing Sheets

FIXING MEANS

THIS INVENTION relates to a temporary fixing means which can be used to support objects on a smooth surface.

Examples of a form of fixing means which constitutes prior art to the invention comprises "fridge" magnets which are used domestically to support messages and the like on metallic surfaces. The difficulty with fridge magnets however relates to the necessity that the surface to which they are applied must be formed of a magnetic material. In addition, their capacity to retain objects is dependant on the strength of the magnet used. Furthermore when an item is located between the fridge magnet and the surface the cupacity of the fridge magnet to retain the item in position is reduced.

It is an object of this invention to provide a fixing means which can be applied to a smooth surface formed of any material and which is capable of retaining one or more articles on that surface.

Accordingly the invention resides in a fixing means comprising a support adapted to be engageable with a surface and which is capable of removal from the surface, a support portion provided on the support, a resilient retention means formed of a resiliently flexible sheet material fixed to the support portion to extend to at least one side of the support, said retention means having at least two bearing portions being angularly spaced from each other and which each comprise a linear surface extending radially from the support, said sheet material being contoured between the linear surfaces to be able to bias the linear surfaces into engagement with the surface when the support is applied to the surface.

According to a further preferred feature of the invention, the contour of the retention means comprises a fold which extends radially from the support intermediate of the linear surfaces.

According to a further preferred feature of the invention, the support comprises a suction cup.

According to a further preferred feature of the invention, the retention means is substantially transparent.

The invention will be more fully understood in the light of the following description of several specific embodiments. The description is made with reference to the accompanying drawings of which;

Figure 1:
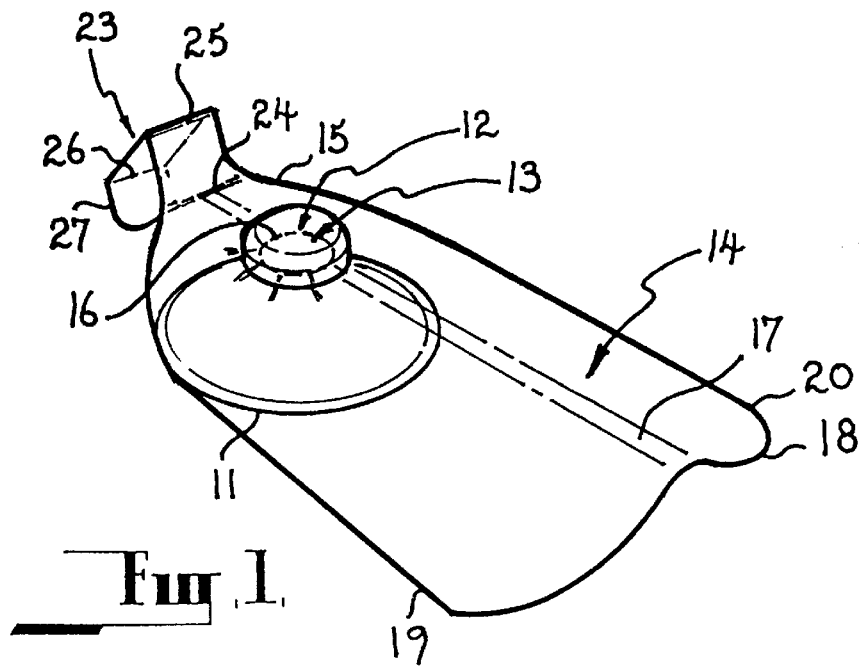
FIG. 1 is an isometric view of one embodiment of the invention in the unattached state.
Figure 2:
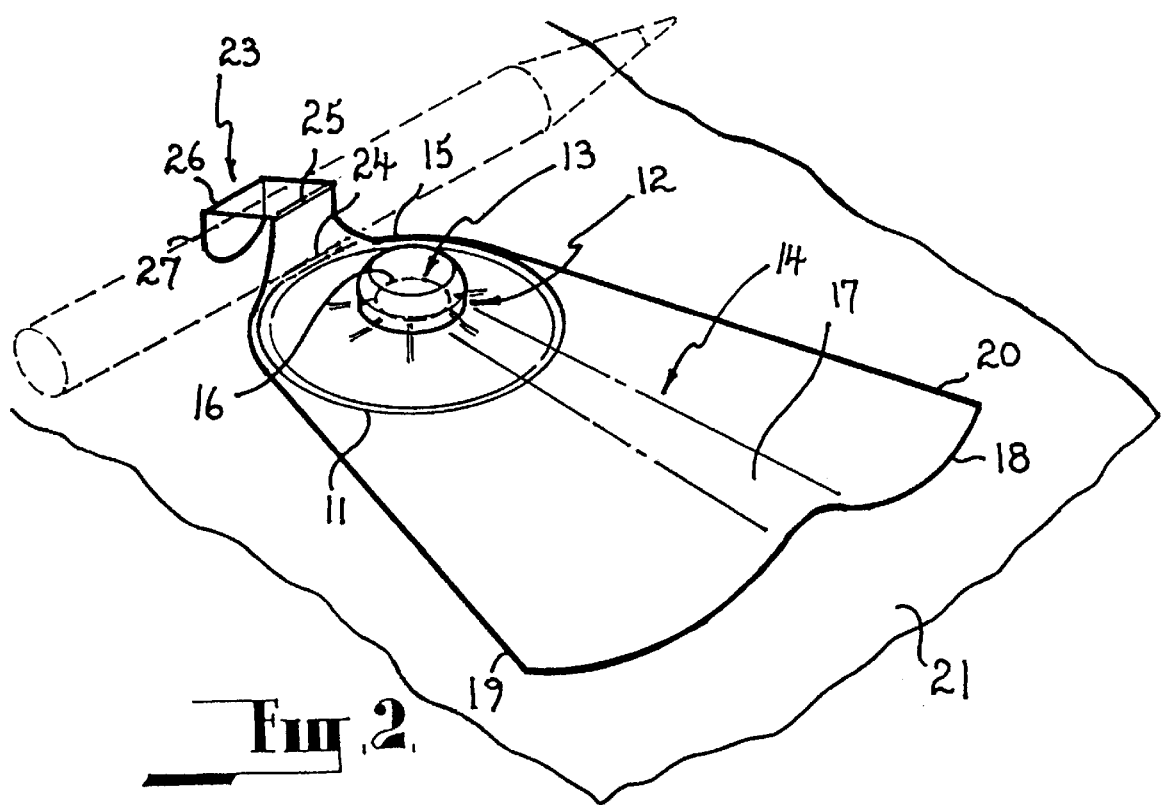
FIG. 2 is an isometric view of the embodiment of FIG. 1 in the attached state.
Figure 3:
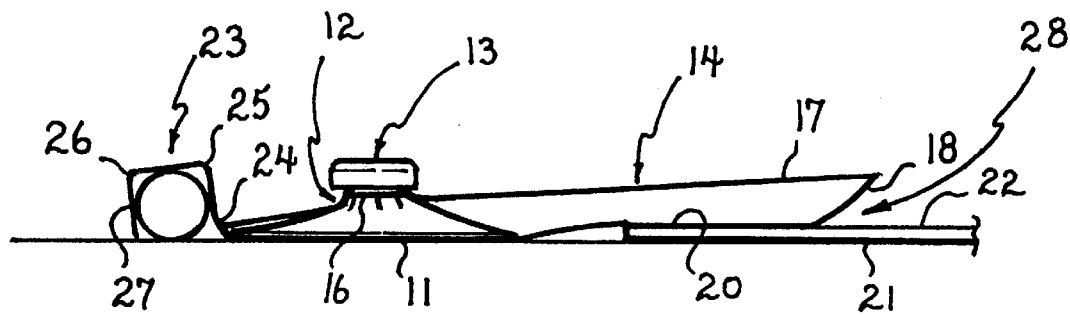
FIG. 3 is a sectional side view of the one embodiment of FIG. 1 in the attach state.

The embodiment as shown at FIGS. 1, 2 and 3 comprises a fixing means which is to be utilised in holding objects onto a smooth surface. One particular application of the embodiment comprises a fixing means for retaining objects such as a sheet of paper to a white board whereby a number of fixing means of the embodiment may be used to support the top of a sheet which is supported from a white board.

The embodiment comprises a support in the form of a suction cup 11 which is provided with a support portion in the form of a central outwardly extending boss 12 having an enlarged outer end 13.

The retention means 14 of the embodiment comprises a substantially triangular piece of transparent resilient sheet material. The material may comprise celluloid, a suitable plastics material or any like material. The apex 15 of the triangular piece of material is formed to be substantially part circular and is substantially concentric with the suction cup 11 whereby its outer perimeter extends beyond the outer perimeter of the suction cup 11.

Figure 4:
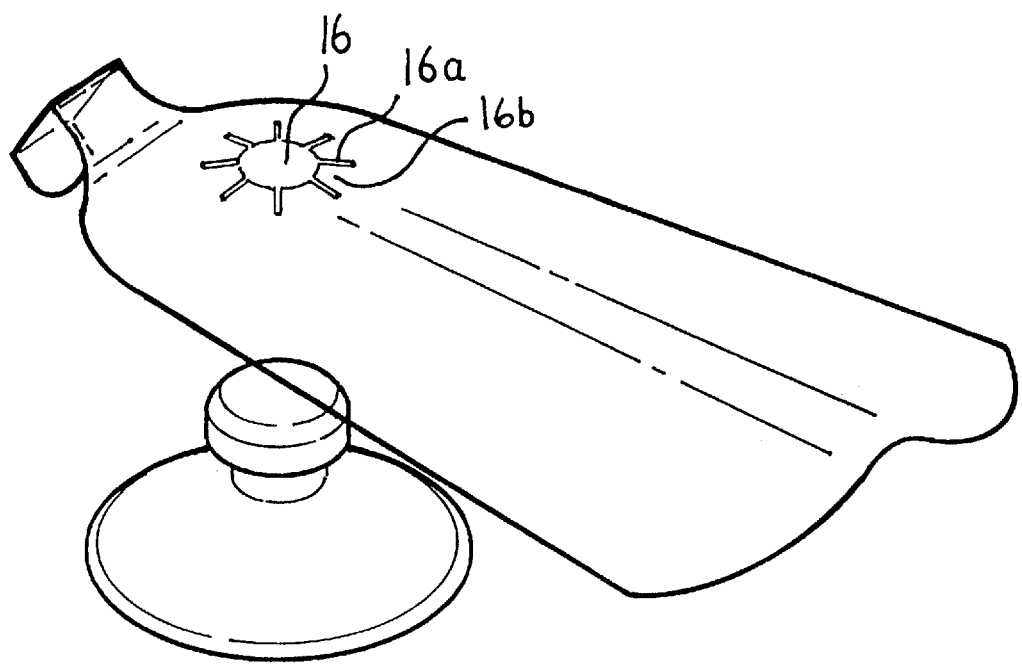
FIG. 4 is an exploded view of the one embodiment.
Figure 5:
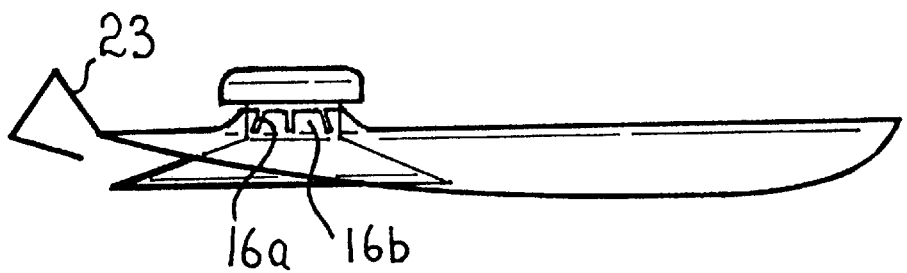
FIG. 5 is a side view of the one embodiment.
Figure 6:
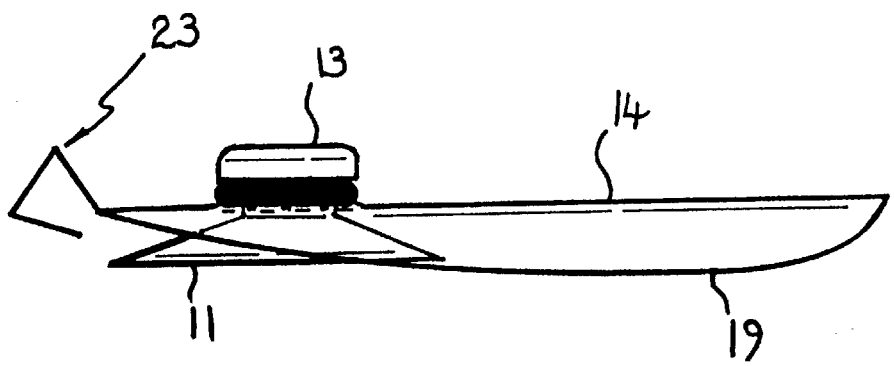
FIG. 6 is a side view of the embodiment with a ring applied around the boss.

An aperture 16 is provided in the region of the apex 15 of the triangular shape and is configured such that it can be snugly engaged with the boss 12 and in becoming so engaged will resiliently pass over the enlarged head 13 to be retained in position between the enlarged head 13 and the suction cup 11 and when in position is rigidly retained. In the case of the embodiment and as shown at FIGS. 4 and 5, the aperture 16 has a diameter less than the enlarged head 13 and the diameter of the aperture is formed with radial cuts 16a which enable the aperture to pass over the enlarged head 13. The cuts 16a result in tabs 16b which when received over the enlarged head 13 bear against the under surface of the head and force the undersurface of the retention means against the upper surface of the suction cup. As shown in FIG. 6 to improve the biassing force applied by the tabs 16b a ring which may or may not be resilient is engaged around the tabs 16b.

The retention means 14 is contoured by means of a radial fold 17 which extends from the apex 15 to the base 18 of the retention means 14 whereby the outer cross sectional profile of the retention means 14 is substantially convex.

As a result of the fold 17, the sides 19 and 20 of the unattached retention means 14 extend at their outer end below the plane of the lower surface of the suction cup 11. As a result, when the section cup 11 is applied to a surface such that it is retained by suction onto that surface as shown at FIG. 2 the retention means is caused to be resiliently deflected such that the sides 19 and 20 are resiliently biased into engagement with the surface. This resilient engagement is facilitated by the resilient deflection of each side portion of the retention means 14 between the respective side and the central fold 17 and resilient deflection at the fold.

On insertion of an item such as a piece of paper 22 or the like between the sides 19 and 20 of the retention means 14 and the surface 21, the sides 19 and 20 are subjected to further resilient deflection and are resiliently biased into engagement with that item to provide frictional engagement between the item 22 and the sides 19 and 20 of the fixing means and a clamping force between the sides 19 and 20 and the surface 21 which is greater than the clamping force applied in the absence of the piece of paper. The embodiment provides a means for supporting many pages of paper to a surface.

The apex 15 is formed with a tab member 23 which is formed as a strip-like radial extension of the material constituting the retention means 14 whereby the fold 24 which constitutes the junction between the apex 15 and the tab member 23 constitutes a resilient hinge. The junction between the tab 23 and the retention means to either sides of the fold 24 is formed as a continuous curve. The tab member 23 is formed with two further folds 25 and 26 spaced at intervals along its length whereby the outermost portion 27 is articulated in respect to the retention means 14 such that it can be pivotally moved into and out of engagement with the edge of the suction cup 11. The purpose of the tab 23 is to facilitate disengagement of the suction cup 1 1 from the surface 22 on insertion of the outer end of the outer portion 27 between the surface 21 and the suction cup 11 to break the suction therebetween.

The tab 23 can also be used to retain an item such as a pen 28. This can be done by plastically deforming the tab 23 at the folds 24, 25 and 26 such that the tab 23 will resiliently hold the pen 28 as shown at FIG. 1.

The retention means 14 is substantially transparent such that any text or design material which may be present on the portion of the item 22 underneath the fixing means is readily visible.

In use, the suction cup 11 is applied onto a surface and in so applying the suction cup to the surface the sides 19 and 20 are brought into resilient engagement with the surface 21 to enable the retention of an object between the retention means 14 and the surface 21. In order to disengage the fixing means from the surface, the tab 23 is articulated such that the outer end 27 engages between the suction cup 11 and the surface 21 to effect separation of the suction cup 11 from the surface 21.

The fixing means according to the embodiment shown at FIGS. 1, 2 and 3 provides a means which can be applied to any form of smooth surface which may be either metallic or non-metallic for the purposes of retaining articles including paper, pens, maps, posters, or the like in engagement with that surface without causing deterioration of the surface. Because of the transparent nature of the suction cup 11 and the retention means 14 the fixing means is relatively unobtrusive and therefore can be applied to windows or the like without significantly impairing any visibility. In addition, in fixing any item to a surface utilising the fixing means the fixing means will not unnecessarily detract from any of the visual material contained on the material being so fixed. In addition, the fixing means may be used in association with the smooth surface for the purposes of retaining the pages of the publication such as a magazine or a book, open. The fixing means is located to one side of the pages of the book whereby as each page is turned, it is engaged underneath the retention means to be fixed to the surface thereby.

Figure 8:
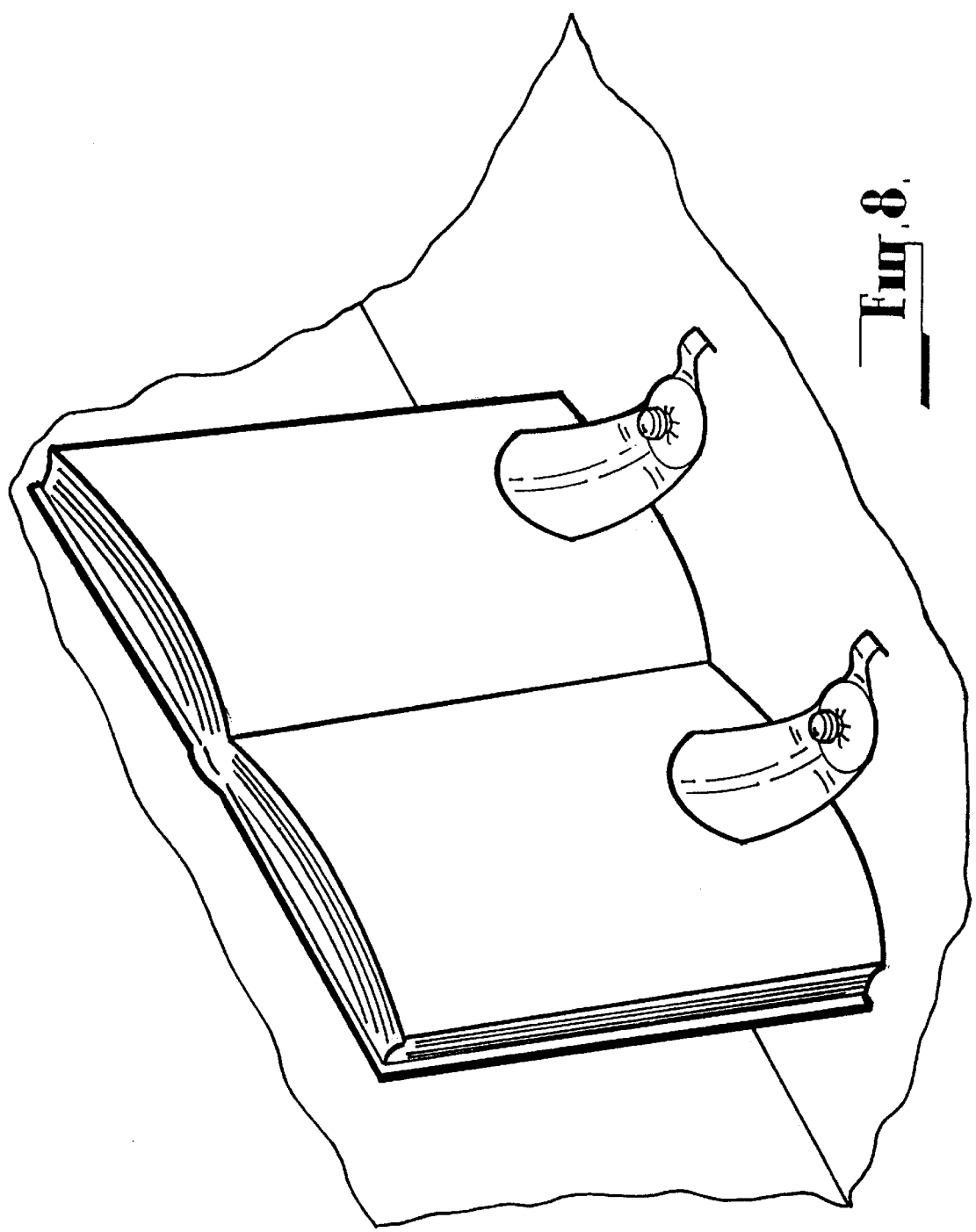
FIG. 8 is an isometric view of an application of the embodiment.

A further application of the embodiment as shown at FIG. 8 comprises a page support for a book or file which is supported to be upwardly inclined from the surface away from the surface away from the reader. By placing the fixing means in front of the book with the retention means supported on the exposed pages of the book the fixing means will hold the book in the inclined position with the retention means holding the pages down.

A feature of the fixing means is that the retaining force applied by the retention means when an item is positioned between it and the surface increases when the item is placed in position. In addition the retaining force of the fixing means can be increased by plastically increasing the contour of the fold 17.

Figure 7:
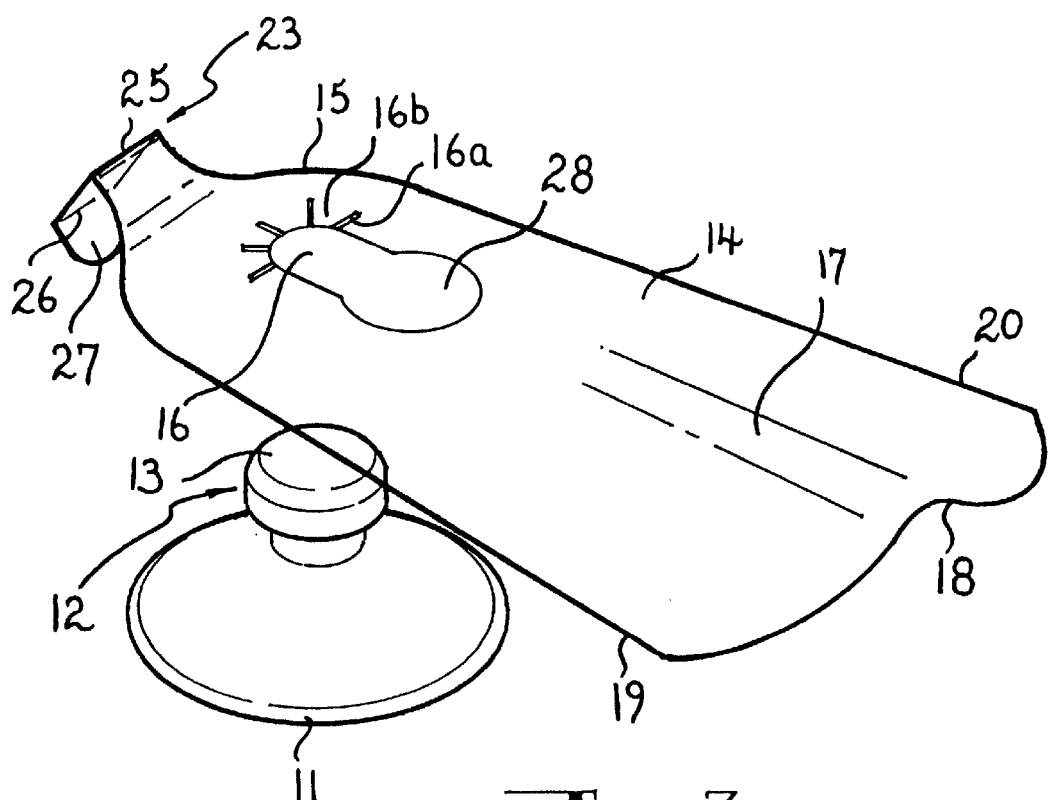
FIG. 7 is an exploded view of another embodiment.

It is also a feature of the embodiment as shown in the drawings that the outer end of each of the linear bearing surfaces is configured such that the entry 28 into the area defined between the bearing surfaces and the surface 21 is convergingly tapered which facilitates entry of the edge of a piece of paper or a like item into the space According to an alternative embodiment of this invention and as shown at FIG. 7 the aperture .16 may be formed as the reduced width portion of a key hole slot 28.

It should be appreciated that the scope of the invention need not be limited to the particular scope of the embodiment described above. In particular, the retention means need not have the geometric configuration of the embodiment. For example, the retention means may be fan shaped and may have a corrugated profile constituted by a plurality of radial folds whereby the depression between each fold provides a radial linear surface which will be caused to bear onto the surface to serve as a retention means. Furthermore, if desired, the linear surfaces which are constituted by the sides 19 and 20 of the embodiment shown in the drawings or of the example referred to immediately above, may be modified such as to enhance their frictional engagement with the item located thereunder.

In addition the retention means can be formed of any suitable material including sheet metal, a plastics material or the like.

In addition the retention means need not be transparent and may be provided with a decorative pattern, textual material or advertising material.

In addition the suction cup may be provided with a release valve.

Alternatively or in addition the suction cup may be provided with a decorative pattern, textual material or advertising. Alternatively or in addition, the boss may be adapted to support an additional item such as a button or a decorative element.

I claim:

1. A fixing means comprising a support adapted to be engageable with a surface and which is capable of removal from the surface, a support portion provided on the support, a resilient retention means formed of a resiliently flexible sheet material fixed to the support portion to extend to at least one side of the support, said retention means having at least two bearing portions being angularly spaced from each other, each bearing portion radiating from the support and defined by a linear surface that extends from the support to an outer region of said retention means said sheet material being contoured between the linear surfaces to be able to bias the linear surfaces into engagement with the surface when the support is applied to the surface.

2. A fixing means as claimed at claim 1 wherein the retention means is supported from the support portion such that the bearing portions will engage the surface before the support whereby application of the support to the surface will provide at least a portion of the biassing of the bearing portions into engagement with the surface.

3. A fixing means as claimed at claim wherein the support comprises a suction cup having an upper surface opposite a mounting surface.

4. A fixing means as claimed at claim 3 wherein the support portion comprises a central boss provided on said suction cup, said boss-having an enlarged outer end and a shank disposed between the enlarged outer end and the suction cup, wherein said retention means is formed with an aperture which is received over the boss to be engaged on the shank.

5. A fixing means as claimed at claim 4 wherein the aperture has a diameter less than the diameter of the boss between the suction cup and enlarged outer end.

6. A fixing means as claimed at claim 5 wherein the perimeter of the aperture is formed with a plurality of angularly spaced radial tabs which at their inner ends engage along a surface of the enlarged outer end of the boss adjacent to the shank to bias the retention means into engagement with the upper surface of the suction cup and provide at least some of said biassing of the bearing portions on deflection of the suction cup when applied to the surface.

7. A fixing means as claimed at claim 6 wherein a ring is snugly received around the tabs.

8. A fixing means as claimed at claim 4 wherein the aperture comprises a narrower end portion of a key hole slot.

9. A fixing means as claimed at claim 4 wherein the retention means is substantially transparent.

10. A fixing means as claimed at claim 1 wherein the retention means is contoured outwardly from the surface between the linear surfaces.

11. A fixing means as claimed at claim 1, wherein the contour of the retention means comprises a fold extending radially from the support intermediate of the linear surfaces.

12. A fixing means as claimed at any one of claims 1, wherein the sheet material comprises a celluloid.

13. A fixing means as claimed at any one of claims 1, wherein the sheet material comprises a plastics material.

14. A fixing means as claimed at any one of claims 1, wherein the sheet material comprises metal.

15. A fixing means as claimed at claim 1 wherein the retention means forms a substantially triangular piece of sheet material.

16. A fixing means as claimed at claim 15 wherein said triangular sheet has a base and two sides, and wherein said bearing portions are spaced inwardly of said sides.

17. A fixing means as claimed at claim 16 wherein the linear surfaces terminate at the base.

18. A fixing means as claimed at claim 15 wherein said triangular sheet has an apex, and the apex is substantially part circular and substantially concentric with the support.

* * * * *